(12) United States Patent
He et al.

(10) Patent No.: US 12,554,553 B2
(45) Date of Patent: Feb. 17, 2026

(54) DYNAMIC SCALING FOR WORKLOAD EXECUTION

(71) Applicant: International Business Machines Corporation, Armonk, NY (US)

(72) Inventors: Jin Chi JC He, Xian (CN); Guang Han Sui, Beijing (CN); Peng Li, Xian (CN); Gang Pu, Xian (CN); Gang Wang, Xi'an (CN); Liang Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 17/498,011

(22) Filed: Oct. 11, 2021

(65) Prior Publication Data

US 2023/0114504 A1    Apr. 13, 2023

(51) Int. Cl.
  *G06F 9/50* (2006.01)
  *G06F 9/54* (2006.01)

(52) U.S. Cl.
  CPC .......... *G06F 9/5077* (2013.01); *G06F 9/5016* (2013.01); *G06F 9/5044* (2013.01); *G06F 9/5083* (2013.01); *G06F 9/546* (2013.01)

(58) Field of Classification Search
  CPC .... G06F 9/5044; G06F 9/5055; G06F 9/5077; G06F 9/546
  See application file for complete search history.

(56) References Cited

U.S. PATENT DOCUMENTS

| | | | |
|---|---|---|---|
| 8,621,052 B2 | 12/2013 | Keohane et al. | |
| 10,303,492 B1* | 5/2019 | Wagner | G06F 9/547 |
| 11,481,243 B1 | 10/2022 | Wang et al. | |
| 2020/0225990 A1* | 7/2020 | Vaddi | G06F 9/455 |
| 2021/0064433 A1 | 3/2021 | Nakfour | |
| 2021/0294651 A1* | 9/2021 | Misca | G06F 9/5061 |

(Continued)

FOREIGN PATENT DOCUMENTS

| | | |
|---|---|---|
| CN | 102929725 A | 2/2013 |
| CN | 111880816 A | 11/2020 |
| WO | 2020151306 A1 | 7/2020 |

OTHER PUBLICATIONS

"Diego Najar, Keep a container running for troubleshooting on Kubernetes, https://varlogdiego.com/keep-a-container-running-on-kubernetes" (Year: 2019).*

(Continued)

*Primary Examiner* — Lewis A Bullock, Jr.
*Assistant Examiner* — Carlos Alberto Espana
(74) *Attorney, Agent, or Firm* — CANTOR COLBURN LLP; Stephen Yoder

(57) ABSTRACT

Aspects of the invention include receiving, by a controller, a workload comprising one or more tasks, generating a first pod comprising a first sidecar container, generating one or more ephemeral containers for the first pod based on the workload and one or more resource allocation metrics for the pod, executing the one or more tasks in the one or more ephemeral containers, monitoring the one or more resource allocation metrics for the pod, and generating at least one new ephemeral container in the first pod based on the one or more resource allocation metrics for the pod and the workload.

17 Claims, 11 Drawing Sheets

(56) References Cited

U.S. PATENT DOCUMENTS

2023/0109368 A1\* 4/2023 Ni ............................ G06T 1/20
  718/104
2023/0325258 A1\* 10/2023 Wang ................. H04L 43/0817
  718/105

OTHER PUBLICATIONS

Anonymous, "Kubernetes Cluster Autoscaling Based on Cost Optimization, Including Licensing Costs," IP.com Prior Art Database Technical Disclosure, IP.com No. IPCOM000263720D, Sep. 29, 2020, 4 pages.

Fu et al., "Fast and Efficient Container Startup at the Edge via Dependency Scheduling," 3rd USENIX Workshop on Hot Topics in Edge Computing (HotEdge 20), 2020, 7 pages.

\* cited by examiner

DYNAMIC SCALING FOR WORKLOAD EXECUTION

BACKGROUND

The present invention generally relates to data management, and more specifically, to dynamically scaling workload execution on in a cloud environment Cloud computing refers to the practice of using a network of remote servers hosted on a public network (e.g., the Internet) to deliver information computing services (i.e., cloud services) as opposed to doing so on a local server. The network architecture (e.g., virtualized information processing environment comprising hardware and software) through which these cloud services are provided to service consumers (i.e., a cloud service consumers) is referred to as "the cloud", which can be a public cloud (e.g., cloud services provided publicly to cloud service consumers) or a private cloud (e.g., a private network or data center that supplies cloud services to only a specified group of cloud service consumers within an enterprise), or a community cloud (e.g., a set of cloud services provided publicly to a limited set of cloud service consumers, e.g., to agencies with a specific State/Region or set of States/Regions), dedicated/hosted private cloud, or other emerging cloud service delivery models. The underlying intent of cloud computing is to provide easy, scalable access to computing resources and information technology (IT) services to cloud service consumers.

Cloud services can be broadly divided into four categories: Infrastructure-as-a-Service (IaaS), Platform-as-a-Service (PaaS), Software-as-a-Service (SaaS), and Managed Services. Infrastructure-as-a-Service refers to a virtualized computing infrastructure through which cloud services are provided (e.g., virtual server space, network connections, bandwidth, IP addresses, load balancers, etc.). Platform-as-a-service in the cloud refers to a set of software and product development tools hosted on the cloud for enabling developers (i.e., a type of cloud service consumer) to build applications and services using the cloud. Software-as-a-service refers to applications that are hosted on and available on-demand by cloud service consumers via the cloud. Managed Services refers to services such as backup administration, remote system administration, application management, security services, etc. that are enabled by managed service providers for any Cloud services.

In general, a cloud service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics, which applies specifically to public clouds as opposed to private or hybrid clouds, is that the service is fully managed by a cloud services provider (e.g., the services consumer only needs a suitably equipped client device and network connection). This third functionality is particularly relevant to public clouds. However, private clouds can be managed by an internal IT department or through ITO (IT Outsourcing) contracts. In these examples, I&O (Infrastructure & Operations) administrators act as the cloud provider and, accordingly, this third functionality would be of similar relevance.

The cloud is rapidly being adopted by business and IT users as a way to make their organizations more effective and to save costs. Along with this opportunity comes a new set of pain points and significant risks to enterprises that must be addressed. For example, business users are rapidly investing in their own cloud capabilities (e.g., IaaS, PaaS, and SaaS) to meet business needs while application developers want to move rapidly without the involvement of IT to provision tools and environments. These actions are creating a significant threat to IT management whom are worried about considerations such as, for example, managing costs, chargeback, capacity and resources from the result of unrestrained/unplanned cloud expansion.

SUMMARY

Embodiments of the present invention are directed to for dynamically scaling workload execution in a cloud environment. A non-limiting example computer-implemented method includes receiving, by a controller, a workload comprising one or more tasks, generating a first pod comprising a first sidecar container, generating one or more ephemeral containers for the first pod based on the workload and one or more resource allocation metrics for the pod, executing the one or more tasks in the one or more ephemeral containers, monitoring the one or more resource allocation metrics for the pod, and generating at least one new ephemeral container in the first pod based on the one or more resource allocation metrics for the pod and the workload.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
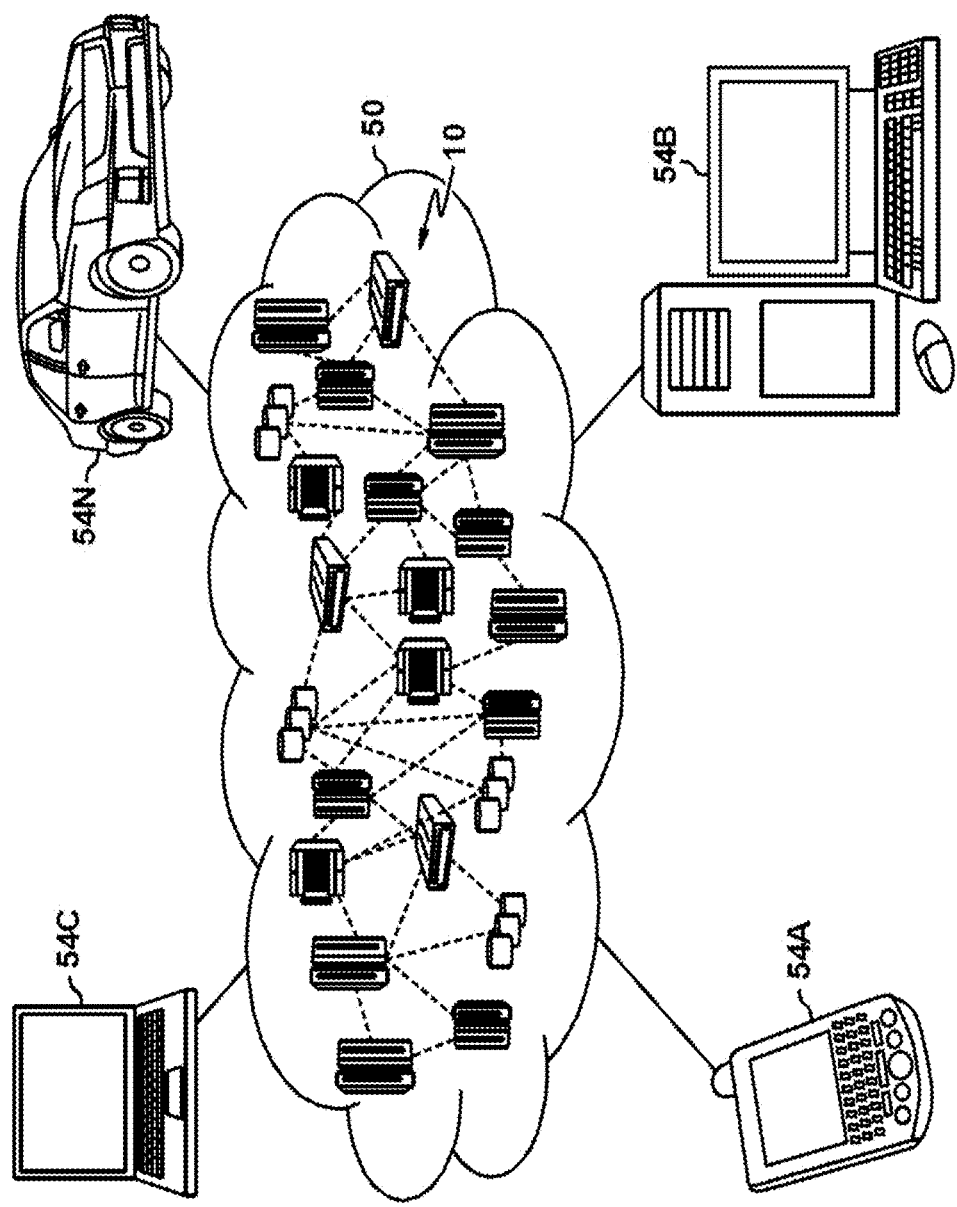
FIG. 1 depicts a cloud computing environment according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provides systems and methods for dynamically scaling workload execution in a cloud environment. The cloud environment can be a platform that manages containerized workloads and services such as, for example, Kubernetes. Kubernetes orchestrates computing, networking, and storage infrastructure on behalf of user workloads. Aspects of the present invention provide systems and processes for scaling execution environments (pods) in the Kubernetes platform. A pod is the basic building block of Kubernetes—the smallest and simplest unit in the Kubernetes object model created and deployed. A pod represents a running process in a distributed computing environment, for example, a computer cluster. A pod encapsulates an application container (or, in some cases, multiple containers) and includes storage resources, a unique network IP, and options that govern how the container(s) should run. A pod represents a unit of deployment: a single instance of an application in Kubernetes, which might consist of either a single container or a small number of containers that are tightly coupled and that share resources. Further aspects of the invention allows for creation of multiple containers within a pod based on a resource allocation metric being monitored for the pod. These multiple containers allow for execution of tasks in parallel without the need to continuously generate a new pod and/or container for each task. Further, additional pods can be generated with these multiple containers for larger workloads that are managed be a pod manager and a controller to execute multiple tasks in parallel. As the resource available changes, pods and/or containers can be created and/or terminated. This allows for maximizing task execution by scaling the pods and containers to execute the tasks in parallel.

An emerging information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside a virtual server, or so-called "virtual machines" (VMs), that are mapped onto physical servers in a data center facility. The virtual machines typically run on top of a hypervisor, which is a control program that allocates physical resources to the virtual machines. Modern hypervisors often use hardware-assisted virtualization, which provides efficient and full virtualization by using virtualization-specific hardware capabilities, primarily from the host CPUs.

Operating system (OS) level virtualization is another approach to virtualization. OS-level virtualization allows the resources of a computer to be partitioned via the operating system kernel's support for multiple isolated user space instances, which are usually called containers. Hence, this approach to virtualization is often referred to as container-based virtualization. Containers may be indistinguishable from separate machines to the end users. Container-based virtualization is widely used in cloud environments. In many of today's data centers, for example, workloads run inside containers. Containers can offer better agility and orchestration for changing demand from the workload. Many technologies are used in container-based virtualization. These technologies include, for example, namespace and cgroups, discussed below.

In a representative container cloud computer environment, a host executes an operating system, such as the Linux kernel. The terminology "Containers", as noted above, refers to an OS-level virtualization mechanism for running isolated computing workloads (containers) on a control host using a single operating system kernel. The approach effectively partitions the resources managed by the single operating system into isolated groups to better balance the conflicting demands on resource usage between isolated groups. In contrast to other types of virtualization, neither instruction-level emulation nor just-in-time compilation is required. In addition, containers can run instructions native to the core CPU without any special interpretation mechanisms. By providing a way to create and enter containers, an operating system gives applications the illusion of running on a separate machine while at the same time sharing many of the underlying resources.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
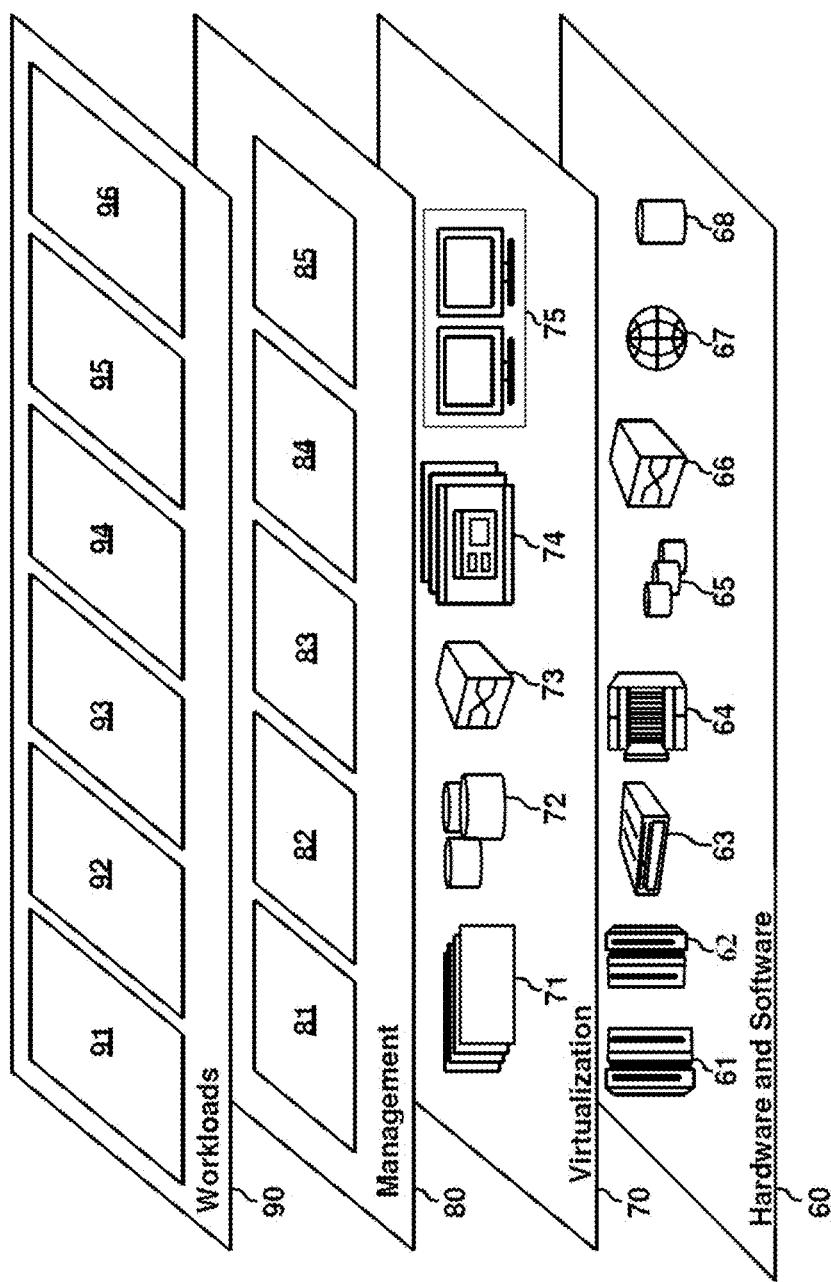
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic scaling for workload execution 96.

Figure 3:
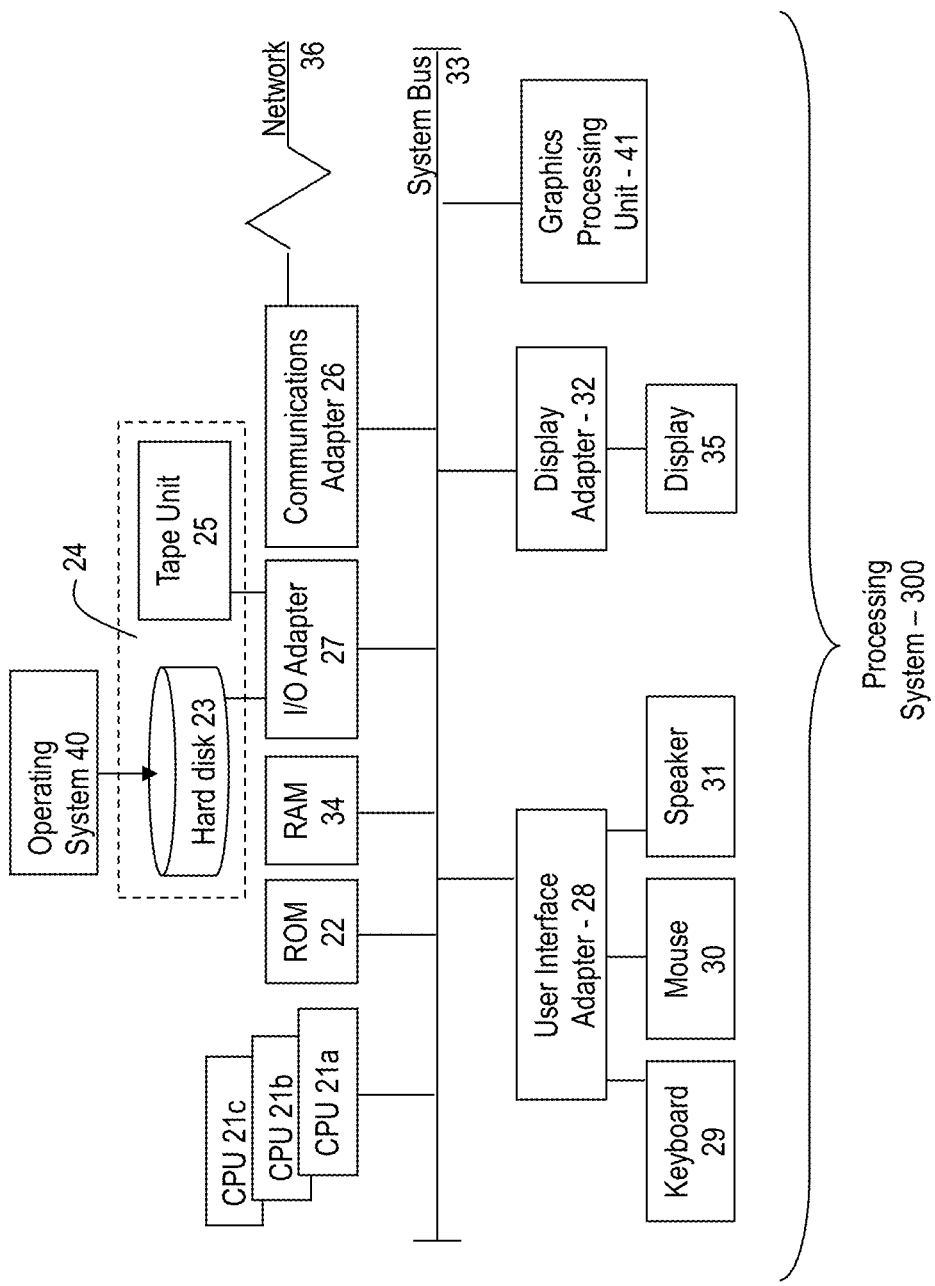
FIG. 3 depicts a block diagram of a computer system for use in implementing one or more embodiments of the present invention.

Referring to FIG. 3, there is shown an embodiment of a processing system 300 for implementing the teachings herein. The processing system 300 can be implemented as a computing node 10. Additionally, some or all of the functionality of the elements of system 300 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Figure 4:
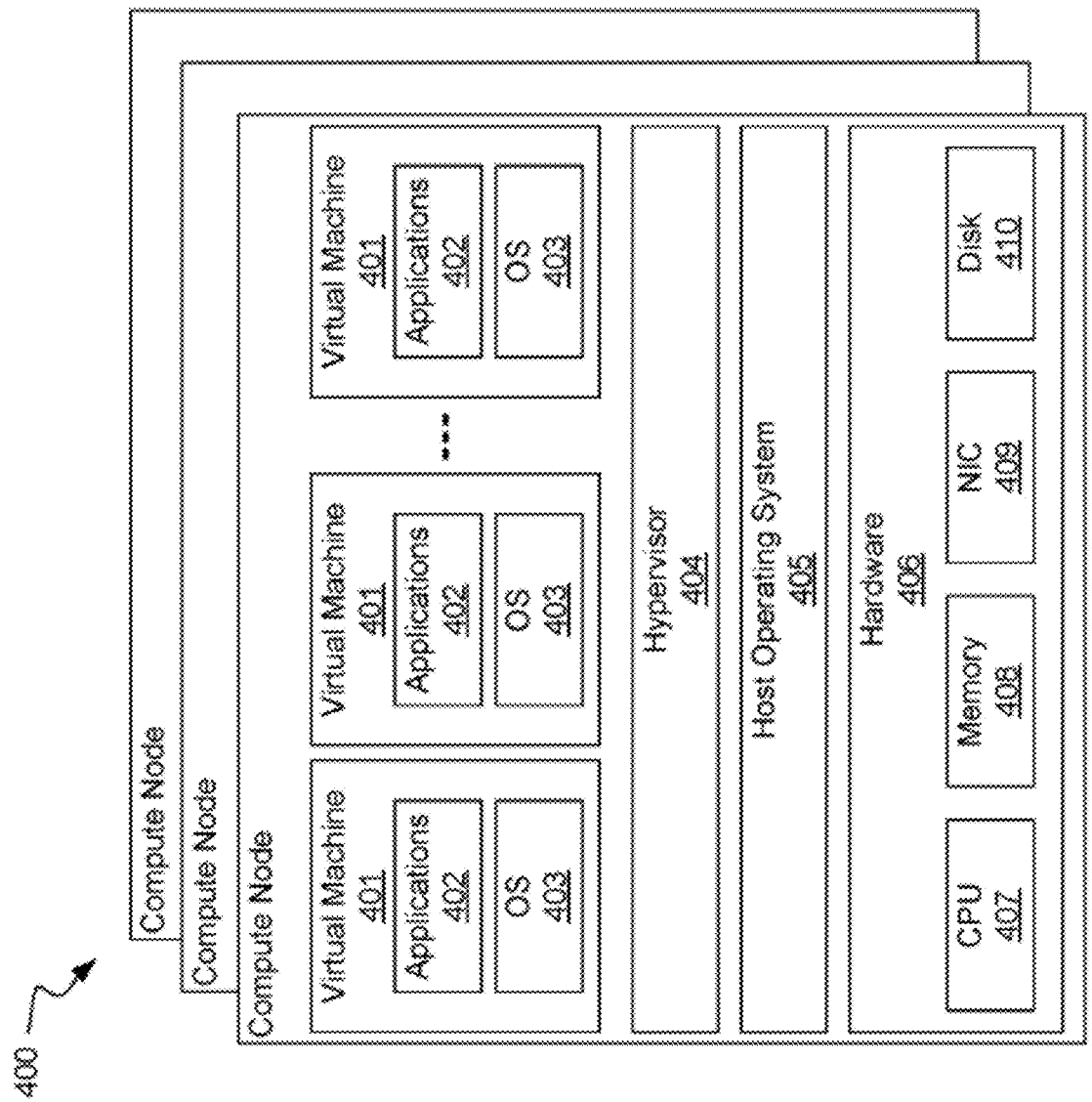
FIG. 4 depicts compute nodes using full virtualization and OS-level virtualization.
Figure 5:
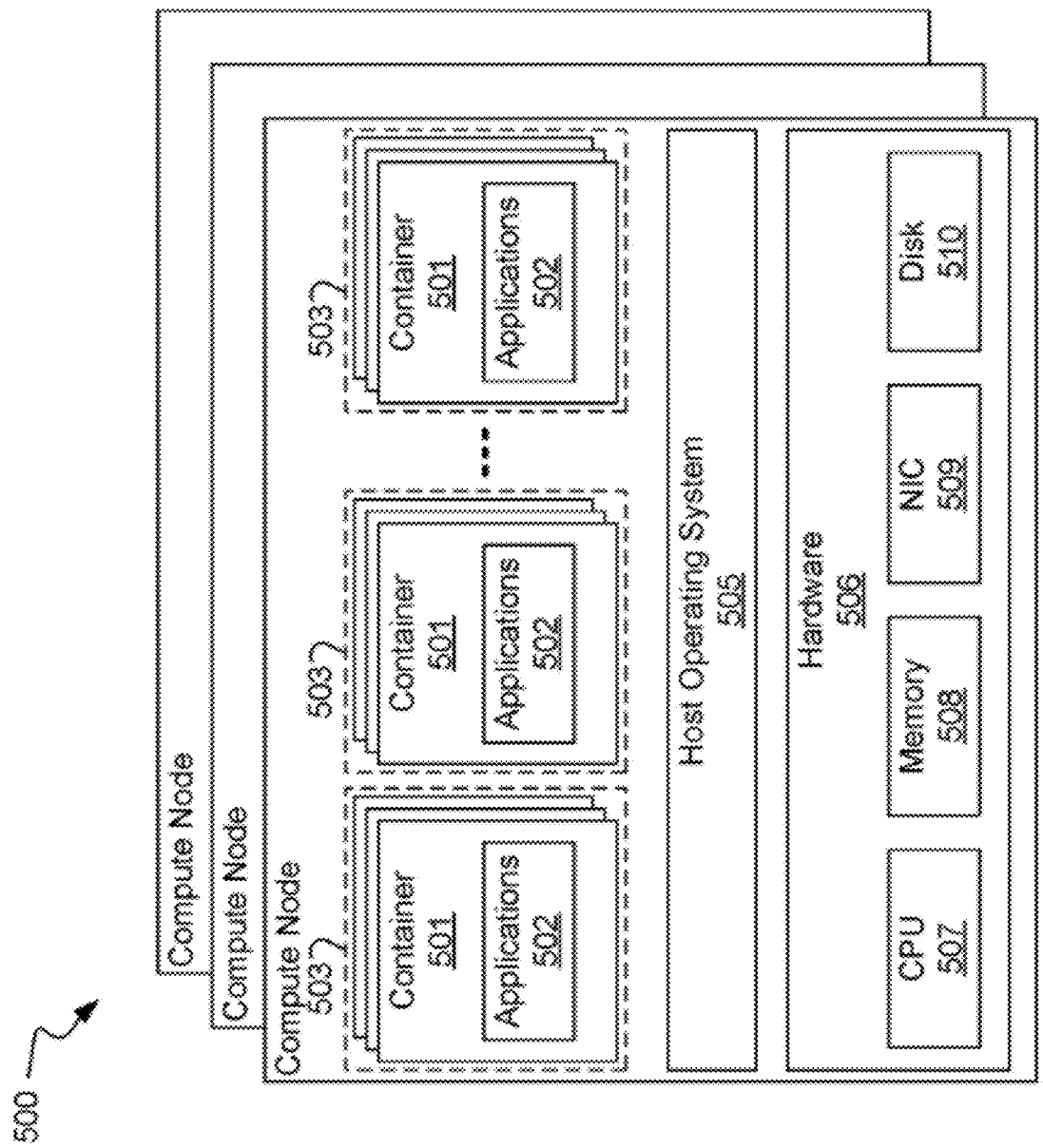
FIG. 5 depicts compute nodes using full virtualization and OS-level virtualization.

FIGS. 4 and 5 show compute nodes 400 and 500, respectively, using full virtualization and OS-level virtualization. Some embodiments of the present invention may be used with any of these types of compute nodes, as well as in hybrid environments with combinations of these compute nodes across single or multiple compute nodes.

As illustrated in FIG. 4, each of the compute nodes 400 includes hardware 406 that may include processors (or CPUs) 407, memory 408, network interface cards (NICs) 409, and disk drives 410. The disk drives 410 may include solid state drives or hard disk drives or some combination of the two. On the hardware, the compute nodes 400 run a host operating system 405. The compute nodes 400 also include a hypervisor 404 to share and manage the hardware 406, allowing multiple different environments 401, isolated from each other, to be executed on the same physical machine 400. The hypervisor 404 may use hardware-assisted virtualization, which provides efficient and full virtualization by using virtualization-specific hardware capabilities, primarily from the host CPUs 407. Each compute node 400 includes one or more virtual machines 401 each of which includes a guest operating system 403 and one or more application programs (or applications) 402 running on the guest operating system 403.

Similarly, as illustrate in FIG. 5, each of the compute nodes 500 includes hardware 506 that may include processors (or CPUs) 507, memory 508, network interface cards (NICs) 509, and disk drives 510. The disk drives 510 may include solid state drives or hard disk drives or some combination of the two. On the hardware, the compute nodes 500 run a host operating system 505. Each compute node 500 includes one or more containers 501 each of which includes one or more applications 502.

In accordance with some embodiments, the compute node 500 may include one or more pods 503 each of which includes one or more containers 501 each of which includes one or more applications 502. In Kubernetes, for example, containers run in a pod.

"Kubernetes" is a portable, extensible open-source platform for managing containerized workloads and services. It facilitates both declarative configuration and automation. Kubernetes orchestrates computing, networking, and storage infrastructure on behalf of user workloads. Kubernetes is an example of an orchestration framework. Containerized workload in a plurality of compute nodes may be managed by a container orchestration manager (COM). An example of a container orchestration manager (COM) is the Kubernetes Master. Several binary components (e.g., master components, node components, and addons) are utilized to deliver a functioning Kubernetes cluster. Master components provide the Kubernetes cluster's control plane (also referred to as "Kubernetes control plane"). Master components may include, but are not limited to, kube-apiserver, etcd, kube-scheduler, kube-controller-manager, and cloud-controller-manager. Master components make global decisions about the Kubernetes cluster. For example, master components handle scheduling. In addition, master components are utilized in detecting and responding to cluster events. For example, master components are responsible for starting up a new pod when a replication controller's "replicas" field is unsatisfied. Master components can be run on any machine in the cluster. Nonetheless, set up scripts typically start all master components on the same machine, and do not run user containers on that machine.

Node components run on every compute node in the Kubernetes cluster. Node components are responsible for maintaining running pods and providing the Kubernetes runtime environment. Node components may include, but are not limited to, kubelet, kube-proxy, and container runtime. Kubelet is an agent that makes sure that containers are running in a pod. The kubelet ensures that the containers specified in a set of PodSpecs provided through various mechanisms are running and healthy. Kube-proxy is a network proxy. The kube-proxy enables the Kubernetes service abstraction by maintaining network rules on the compute node and performing connection forwarding.

Container runtime is software responsible for running containers. More specifically, a container runtime is the node component that handles the lifecycle of a container. The container runtime implements basic concepts such as creating, starting, stopping, and removing a container workload. Kubernetes supports several runtimes including, but not limited to, Docker, containerd, CRI-O, and rktlet.

More generally, Kubernetes supports any implementation of the Container Runtime Interface (CRI) provided by Kubernetes. CRI enables a variety of container runtimes to be plugged in easily. Prior to the introduction of CRI in Kubernetes 1.5, only the default Docker image repository was used and its default OCI-compatible runtime, runC. The Open Container Initiative (OCI) created a runtime specification that details the API for an OCI-compatible container runtime. runC, runV, and Intel's Clear Containers (also known as "cc-runtime) are examples of OCI-compatible container runtimes. runC has built-in support for CRIU—checkpoint/restore in userspace, described below, to checkpoint and restore a container. runV is a hypervisor-based Docker runtime for OCI. runV is also referred to as "Hyper runV".

CRI runtimes are at a higher level of abstraction and should not be confused with an OCI-compatible runtime. A CRI runtime is also referred to as a "CRI shim". CRI shims include cri-containerd, CRI-O, dockershim, and frakti. Some CRI shims (e.g., cri-containerd, CRI-O, and dockershim) call into an OCI-compatible runtime, while others (e.g., frakti) are a monolithic solution.

At least some CRI shims support multiple runtimes running on a single compute node. For example, CRI-O supports the concept of a trusted and an untrusted sandbox. In Kubernetes, a mix of one or more VM-based pods and one or more cgroup/namespace-based pods may be run on a single compute node based on pod annotations and default CRI-O configuration. Containers running inside a VM-based pod may be isolated and managed via namespaces and cgroups, similar to what is done by runC.

Addons are pods and services that are responsible for implementing cluster features. Addons include, but are not limited to, cluster DNS (i.e., a DNS server which serves DNS records for Kubernetes services), Dashboard (i.e., web-based UI for Kubernetes clusters that allows users to manage and troubleshoot applications running in the cluster, as well as the cluster itself), Container Resource Monitoring (i.e., responsible for recording generic time-series metrics about containers in a central database, as well as providing a UI for browsing the data recorded in that database), and Cluster-level Logging (i.e., responsible for saving container logs to a central log store with a search/browse interface).

Turning now to an overview of technologies that are more specifically relevant to aspects of the invention, the Kubernetes platform that manages containerized workloads and services requires a start up process for launching a pod which includes one or more containers. This pod startup process takes three steps. The first step is an initialization/preparation step. The second step is the creation of a sandbox container by the container runtime interface (CRI). The final (third) step is the creation of the real container. The first and second step can take a significant time period (e.g., 2-3 seconds). For each task, a Kubernetes pod must go through this process end to end which can take significant time for running short workloads. There are, for example, two exemplary cases where this time period can cause a problem. The first case is when there is high instantaneous throughput in a cloud environment where there is a need to start one or more pods in a Kubernetes cluster for each user logic. This causes a large number of similar pods starting. These similar pods can be for similar, short workloads such as calling an API. With the 2-3 seconds or more to start a pod, this takes up a significant portion of the entire workload. The second case is when there is a pipeline and one step can include multiple tasks and similar Kubernetes need to start a pod for each task. If the number of tasks in the pipeline is large, all the pods cannot be started due to hardware limitations.

One or more embodiments of the invention address the above-described shortcomings of the prior art by providing systems and processes for dynamically scaling workload execution in a cloud environment. Aspects include dynamically starting multiple containers to execute a workload in a pod for a Kubernetes cluster. Resource metrics and statistics can be collected for allocate resources for execution of the workloads in these pods and containers. The pods can be scaled up and/or scaled down to other nodes in the Kubernetes cluster based on a workload queue. And containers can be associated with workloads and monitored as the workload is being executed.

Figure 6:
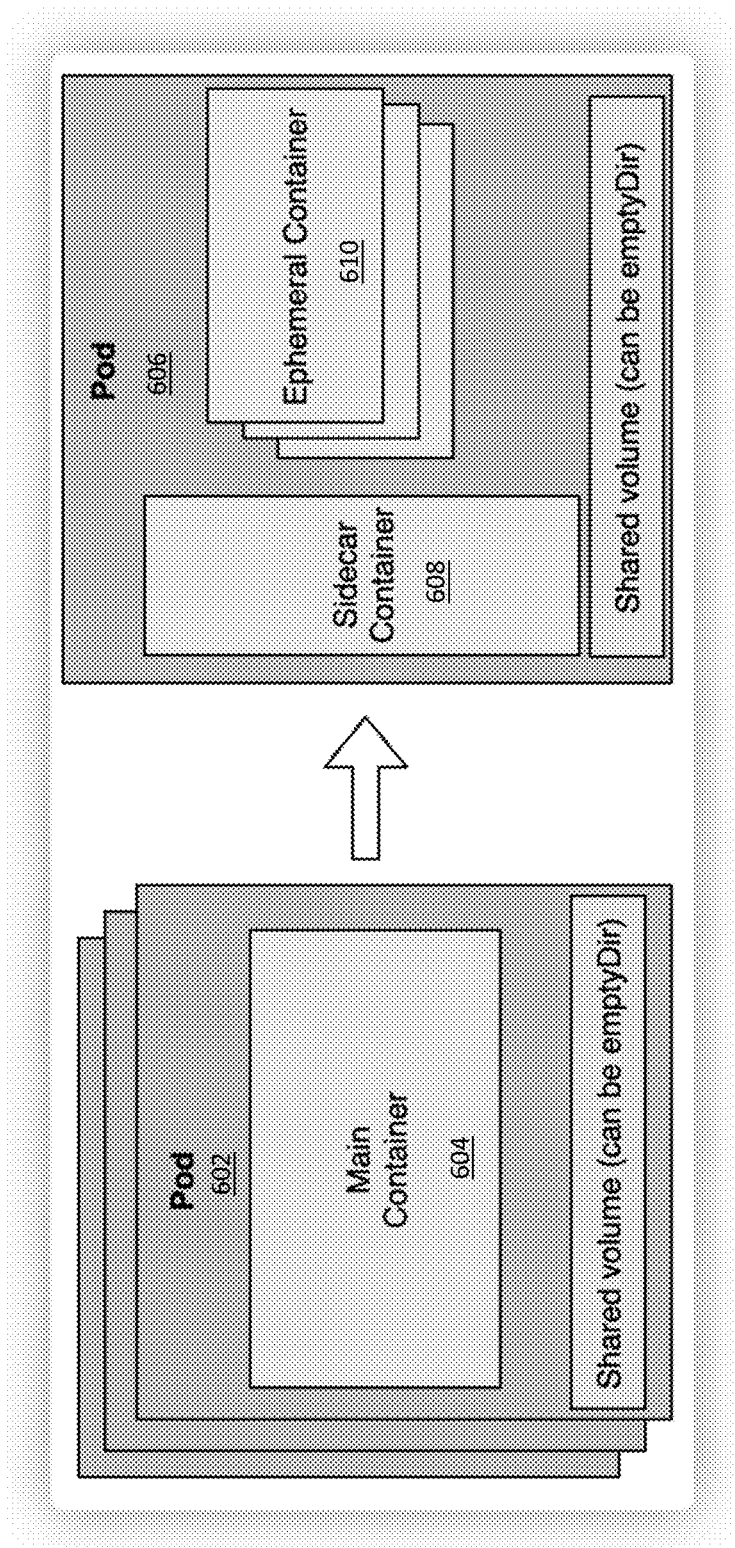
FIG. 6 depicts a block diagram of a Kubernetes pod according to one or more embodiments of the present invention.

FIG. 6 depicts a block diagram of a Kubernetes pod according to one or more embodiments of the present invention. A Kubernetes pod represents a running process in a distributed computing environment, for example, a computer cluster. A pod encapsulates an application container (or, in some cases, multiple containers) and includes storage resources, a unique network IP, and options that govern how the container(s) should run. In a typical configuration, a Kubernetes pod 602 operates a main container 604 that must follow the three-step creation process described above. The main container 604 here is utilized to execute a task for a workload. Also, as mentioned above, the creation of the container can take 2-3 second causing delays in executing tasks, especially tasks that do not require a long time for execution. In one or more embodiments of the present invention, Kubernetes pod 606 is proposed that is created for executing a workload. In this case, a main container is operated as a sidecar container 608. The sidecar container 608 keeps the pod 606 from exiting and transmitting results by executing, for example, a lightweight loop. Additionally, one or more (plurality) of ephemeral containers 610 are generated in the pod 606. The workload and associated tasks can be executing on these ephemeral containers 610 while the sidecar container 608 keeps the pod from exiting. Using a sidecar container 608 avoids having to initialize and sandbox a new container for each task which reduces the execution time for the workload.

Figure 7:
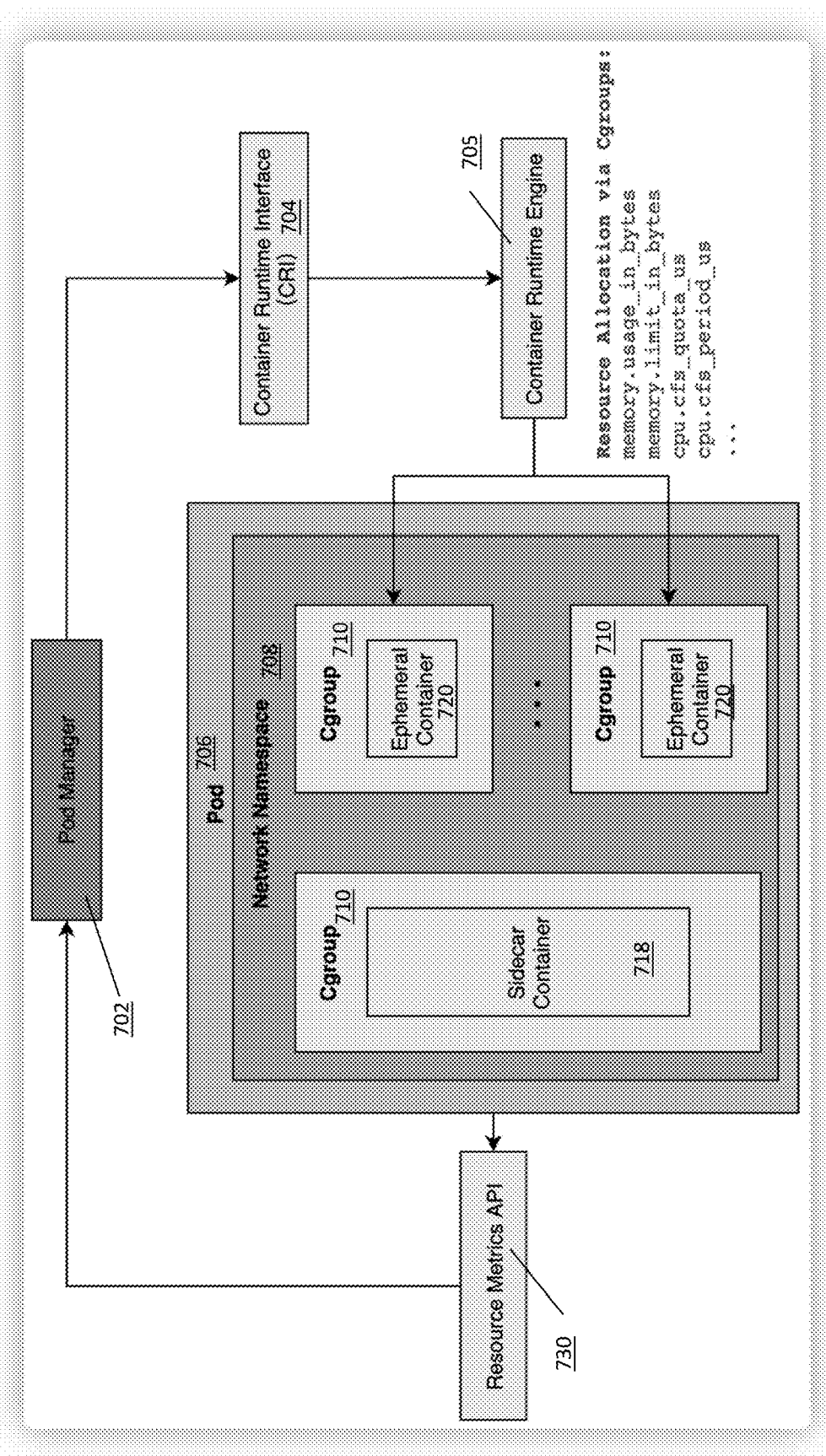
FIG. 7 depicts a block diagram of a pod manager resource managing a pod according to one or more embodiments of the invention.

In one or more embodiments of the invention, the Kubernetes pod 606 can be managed by a pod management module that tracks resource metrics for the ephemeral containers. Currently, setting resources for ephemeral containers is disallowed. However, in one or more embodiments, a pod manager can create the ephemeral containers dynamically by resource limiting to avoid exceeding pod resource limits and grabbing resources by specific container(s). FIG. 7 depicts a block diagram of a pod manager resource managing a pod according to one or more embodiments of the invention. In one or more embodiments, the pod manager 702 can obtain and/or receive resource utilization metrics from a resource metrics API 730. The pod manager 702 can calculate how many containers can be started which can be based on analysis of available resources with respect to the workload and/or a user pre-defined metric. The pod manager 702 then creates and terminates containers with Cgroups 710 that have resources allocated. These steps can be repeated as necessary for execution of a workload. The pod manager 702 interacts with a container runtime interface (CRI) 704 and a container runtime engine 705 to dynamically create and terminate the containers 720. The sidecar container 718, as previously mentioned, executes, for example, a light weight loop to keep the pod 706 from executing. The containers 720 can be built using a namespace 708 in the pod. The Linux kernel has a feature referred to as "namespaces". Linux kernel namespaces, which are the major building block of Linux containers, isolate applications within different "userspaces" such as networks, processes, users, and file systems. A namespace isolates and virtualizes system resources for a collection of processes. Some examples of resources that can be virtualized include process IDs, host-names, user IDs, and the like. A namespace typically refers to namespace types, as well as to specific instances of these types. A Linux operating system is initialized with a single instance of each namespace type. After initialization, additional namespaces can be created or joined. Also, the Linux kernel also provides a functionality called Control Groups, also known as "Cgroups", that allows limitation and prioritization of resources (CPU, memory, block I/O, network, etc.). The cgroups functionality limits various host resources such as CPU count and usage, disk performance, memory, and other process limits.

Figure 8:
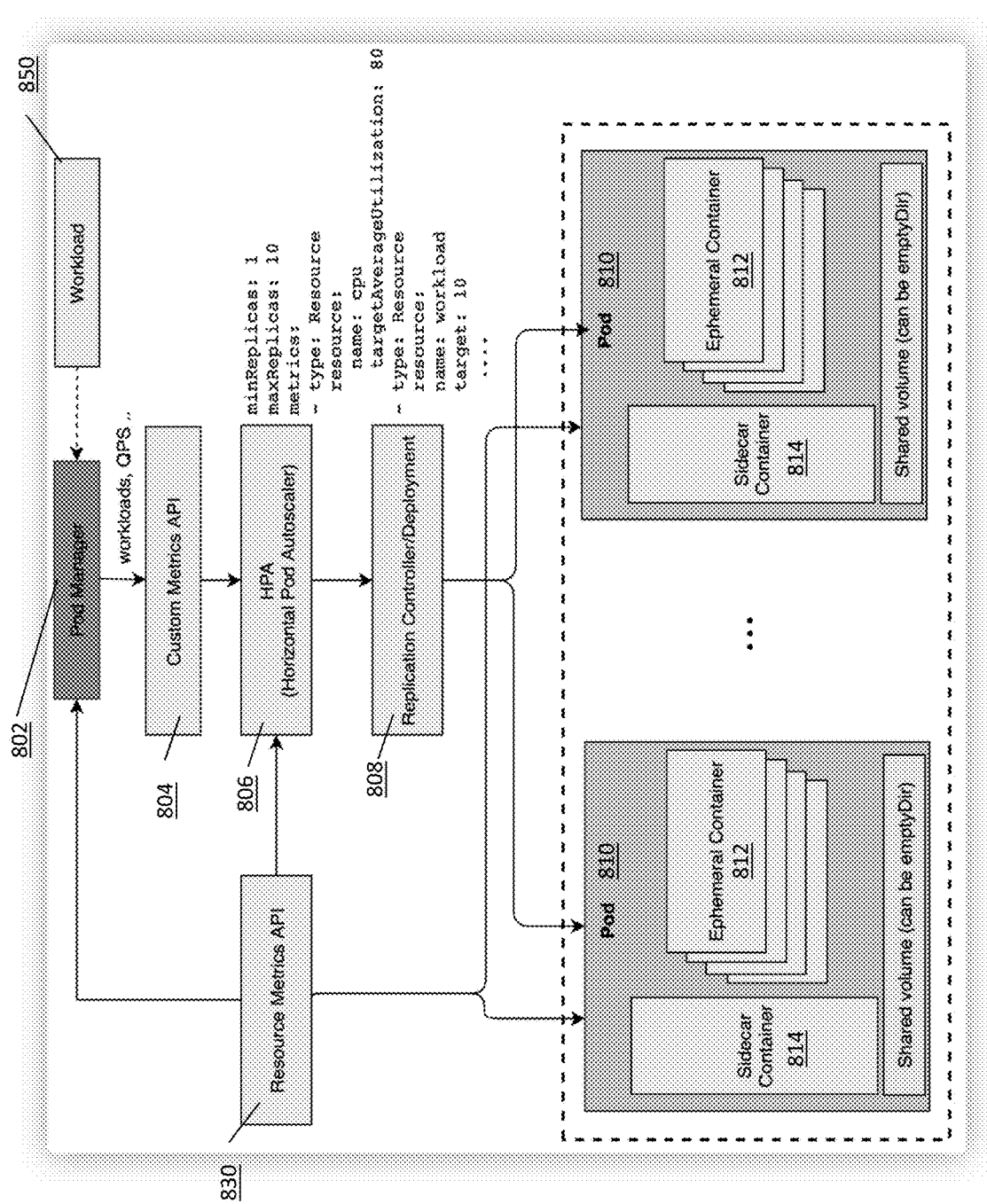
FIG. 8 depicts a block diagram of a pod manager and horizontal pod autoscaler according to one or more embodiments of the invention.

In one or more embodiments of the invention, ephemeral containers can be created and terminated within a pod based on resource allocation and/or workload. Also, in one or more embodiments of the invention, the pods can be scaled up and/or scaled down. As the number of ephemeral containers are increased within a pod, the pod resource will approach a limit where no more ephemeral containers can be created within the pod. In this case, a horizontal pod autoscaler (HPA) can utilized to scale up and/or scale down the pods. FIG. 8 depicts a block diagram of a pod manager and horizontal pod autoscaler according to one or more embodiments of the invention. The pod manager 802 can again receive a workload 850 and utilizing resource metric information collected from the resource metrics API 830, create a pod 810 having a sidecar container 814 and one or more ephemeral containers 812. Based on the resources and/or the workload queue, the pod manager 802 can trigger the HPA 806 to scale up or scale down the pods by updating the custom metrics API 804 and configuration. Thus, more pods 810 can be created to execute the workload 850. Further, the HPA 806 can scale down when the workload queue is smaller (less than a threshold), one or more pods 810 can be terminated to save resources. In some embodiments, the workload 850 can be received from a workload queue manager. The replication controller 808 can scale the pods by creating multiple pods 810. This is referred to as "replication." Replicated pods may be created and managed as a group by an abstraction called a controller.

Figure 9:
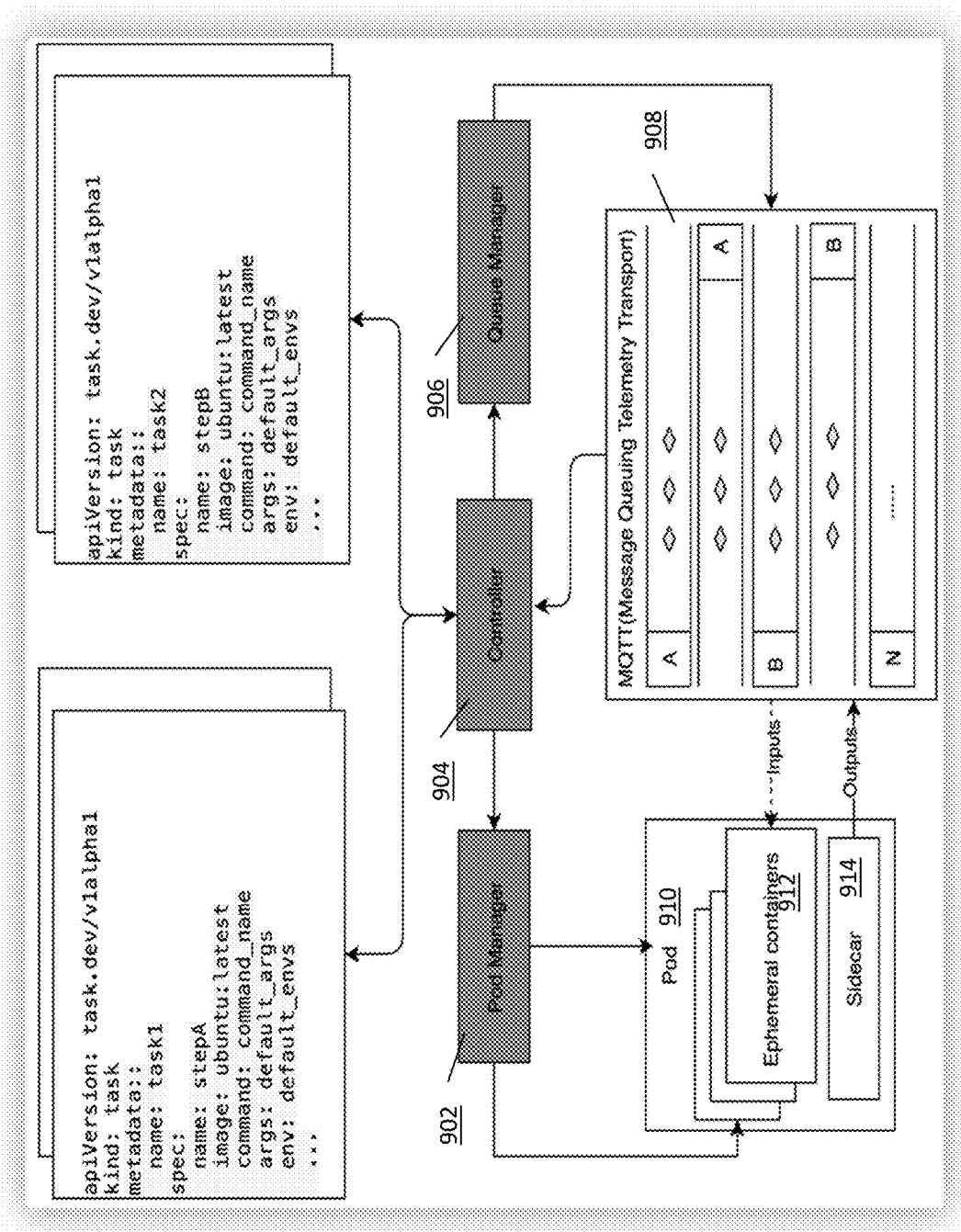
FIG. 9 depicts a block diagram of a controller module communicating with a pod manager and workload queue according to one or more embodiments of the invention.

In one or more embodiments of the invention, multiple pods can be scaled up and/or scaled down. With the creation of multiple pods, a controller module is needed for monitoring workloads and communicating with a pod manager and a workload queue manager to maintain the workload. FIG. 9 depicts a block diagram of a controller module communicating with a pod manager and workload queue according to one or more embodiments of the invention. In one or more embodiments, the controller 904 can communicate with the pod manager 902 which creates the pod(s) 910 having the sidecar container 914 and the one or more ephemeral containers 912. The controller 904 also communicates with a queue manager 906 that manages a workload queue 908. In one or more embodiments, the workload queue 908 can be a message queuing telemetry transport (MQTT) queue. The MQTT queue is exemplary and is not intended to limit the types of queues used herein. In one or more embodiments of the invention, the controller 904 obtains and/or receives definitions of a task from an API-server. The controller 904 can place the tasks into the queue 908 via the queue manager 906. The controller 904 then triggers the pod manager 902 to created ephemeral containers 912 and a sidecar container 914. The sidecar containers 914 monitors the ephemeral containers 912 and sends out results to the message queue 908. The controller 904 obtains the results from the message queue 908 and updates the tasks accordingly.

Figure 10:
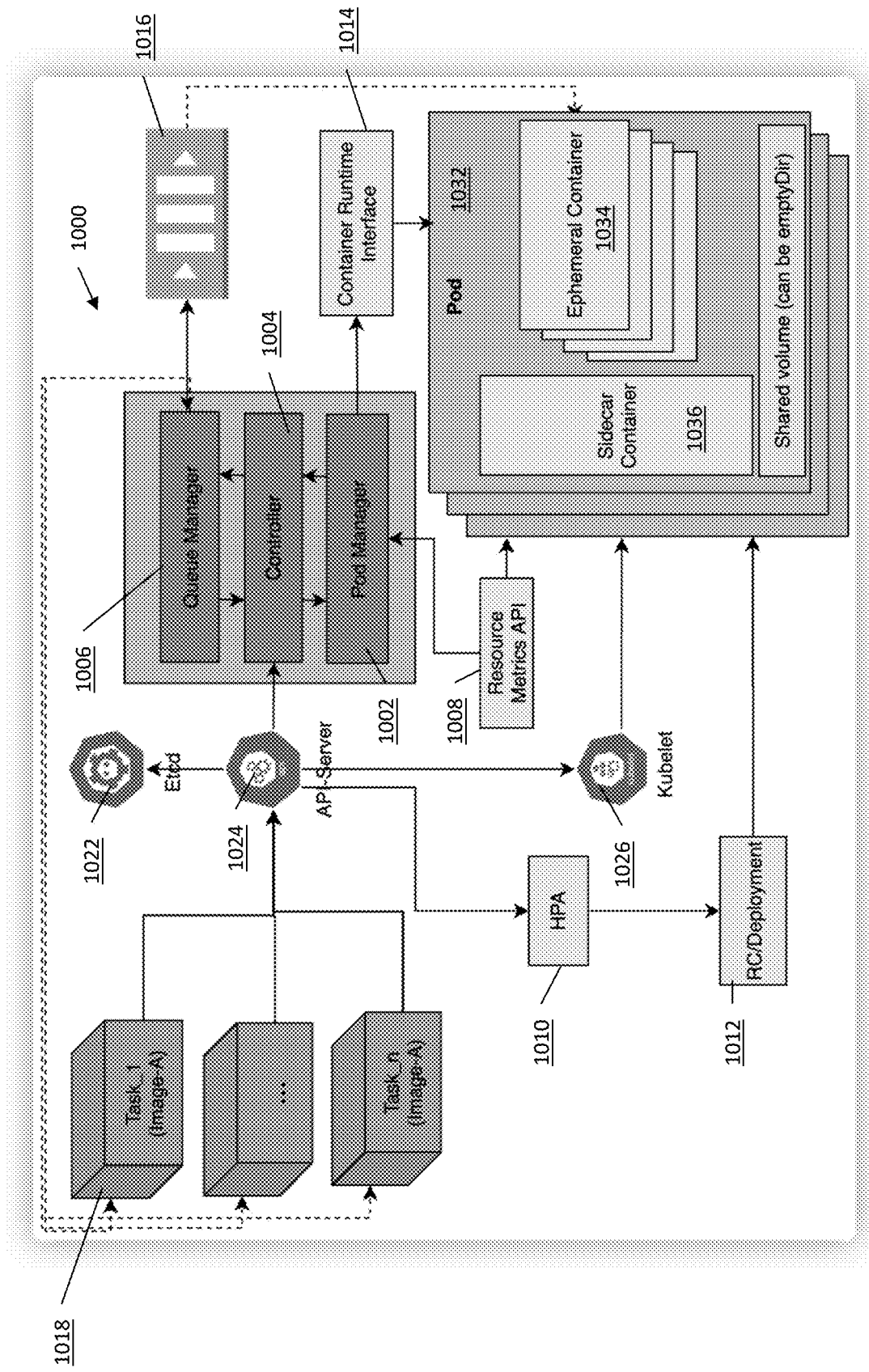
FIG. 10 depicts a system for dynamically scaling workload execution in a cloud environment according to one or more embodiments of the invention.

FIG. 10 depicts a system for dynamically scaling workload execution in a cloud environment according to one or more embodiments of the invention. The system 1000 includes many of the components described in FIGS. 6-9. As such, the system 1000 includes a pod manager 1002, a controller 1004, a queue manager 1006, a resource metrics API 1008, an HPA 1010, a replication controller 1012, a container runtime interface 1014, and a workload/message queue 116. One or tasks 1018 can come through an API server 1024 and sent to the controller 1004. The controller 1004 places the tasks into the queue 1016 through the queue manager 1006. The controller 1004 can trigger the pod managers 1002 to create ephemeral containers 1034 in a pod 1032 as well as a sidecar container 1036 for monitoring and sending out results to the queue 1016. The resource metrics API 1008 monitors resource metrics for the pods 1032. The HPA 1010 and replication controller 1012 can add and/or terminate pods based on the tasks, resources, and/or workload. The pod manager 1002 manages each pod 1032 and can add and/or terminate ephemeral containers 1034 based on the resource allocation metrics.

In one or more embodiments, the system 1000 also includes Kubernetes components such as Etcd 1022 and node component Kubelet 1026. Etcd is a persistent, lightweight, distributed, key-value data store that reliably stores the configuration data of the Kubernetes cluster, representing the overall state of the cluster at any given point of time. Kubelet is an agent that makes sure that containers are running in a pod. The kubelet ensures that the containers specified in a set of PodSpecs provided through various mechanisms are running and healthy.

Figure 11:
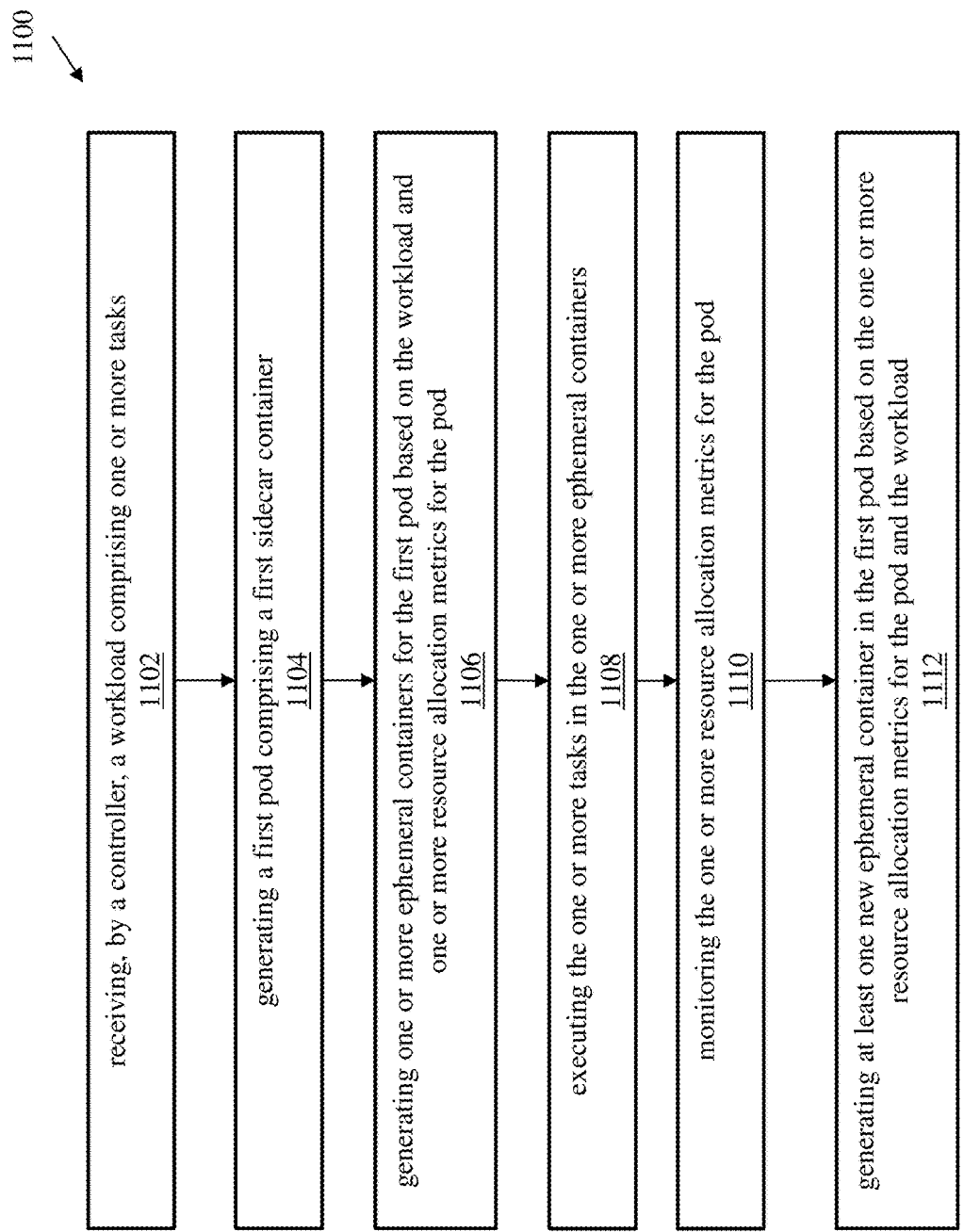
FIG. 11 depicts a flow diagram of a method for dynamically scaling workload execution in a cloud environment according to one or more embodiments of the invention.

FIG. 11 depicts a flow diagram of a method for dynamically scaling workload execution in a cloud environment according to one or more embodiments of the invention. At least a portion of the method 1100 can be executed, for example, by the one or more servers such as the public cloud 120 and/or private cloud 130 shown in FIG. 1. The method 1100 includes receiving, by a controller, a workload comprising one or more tasks, as shown in block 1102. At block 1104, the method 1100 includes generating a first pod comprising a first sidecar container. The first pod being a Kubernetes pod, for example. At block 1106, the method 1100 includes generating one or more ephemeral containers for the first pod based on the workload and one or more resource allocation metrics for the pod. The method 1100, at block 1108, can include executing the one or more tasks in the one or more ephemeral containers. The sidecar container executes, for example, a lightweight loop to keep the pod from exiting. At block 1110, the method 1100 includes monitoring the one or more resource allocation metrics for the pod. The resource allocation metrics can be taken from a resource monitoring API. And at block 1112, the method 1100 includes generating at least one new ephemeral container in the first pod based on the one or more resource allocation metrics for the pod and the workload.

Additional processes may also be included. It should be understood that the processes depicted in FIG. 11 represent illustrations, and that other processes may be added or existing processes may be removed, modified, or rearranged without departing from the scope and spirit of the present disclosure.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a controller, a plurality of workloads each comprising one or more tasks, wherein the one or more tasks of the plurality of workloads are stored in a workload queue;
generating a first pod comprising a main container that is configured as a first sidecar container, wherein the first sidecar container executes a loop that is configured to keep the first pod from exiting;
generating within the first pod, by a pod manager, one or more initial ephemeral containers for the first pod;
executing the one or more tasks in the one or more ephemeral containers, wherein executing the one or more tasks comprises:
executing the one or more tasks in the one or more initial ephemeral containers;
monitoring one or more resource allocation metrics for the pod based on the execution of the initial ephemeral containers; and
based on the workload queue and the monitoring, scaling the first pod using a pod manager and a horizontal pod autoscaler (HPA) to execute the one or more tasks in the workload queue, wherein the scaling the first pod includes the steps:
dynamically generating within the first pod, by a pod manager, one or more additional ephemeral containers for the first pod based on the workloads and one or more resource allocation metrics for the pod, wherein all ephemeral containers are created with resource limits to avoid exceeding pod resource limits;
scaling the first pod using the HPA based on the workload queue and resource metrics, wherein scaling the first pod creates additional pods having one or more ephemeral containers in a Kubernetes cluster when the workload queue exceeds a predefined threshold; and
executing the one or more tasks in the plurality ephemeral containers.

2. The computer-implemented method of claim 1, further comprising:
terminating at least one ephemeral container in the one or more ephemeral containers in the first pod based on the one or more resource allocations metrics.

3. The computer-implemented method of claim 1, further comprising:
determining a maximum ephemeral containers for the first pod based on the one or more resource allocation metrics;
generating a second pod comprising a second one or more ephemeral containers based on the workload requiring a number of ephemeral containers exceeding the maximum ephemeral containers for the first pod.

4. The computer-implemented method of claim 1, wherein the queue comprises a message queuing telemetry transport queue.

5. The computer-implemented method of claim 1, wherein the first pod comprises a Kubernetes pod.

6. The computer-implemented method of claim 1, wherein the first sidecar container transmits results of the workload execution by executing a lightweight loop.

7. The computer-implemented method of claim 1, wherein dynamically generating the one or more ephemeral containers comprises allocating resources to the ephemeral containers based on a predefined threshold for resource utilization metrics.

8. A system comprising:
a memory having computer readable instructions; and
one or more processors for executing the computer readable instructions, the computer readable instructions controlling the one or more processors to perform operations comprising:
receiving, a plurality of workloads each comprising one or more tasks, wherein the one or more tasks of the plurality of workloads are stored in a workload queue;
generating a first pod comprising a main container that is configured as a first sidecar container, wherein the first sidecar container executes a loop that is configured to keep the first pod from exiting;
generating within the first pod, by a pod manager, one or more initial ephemeral containers for the first pod;
executing the one or more tasks in the one or more ephemeral containers, wherein executing the one or more tasks comprises:
executing the one or more tasks in the one or more initial ephemeral containers;
monitoring one or more resource allocation metrics for the pod based on the execution of the initial ephemeral containers; and
based on the workload queue and the monitoring, scaling the first pod using a pod manager and a horizontal pod autoscaler (HPA) to execute the one or more tasks in the workload queue, wherein the scaling the first pod includes the steps:
dynamically generating within the first pod, by a pod manager, one or more additional ephemeral containers for the first pod based on the workloads and one or more resource allocation metrics for the pod, wherein all ephemeral containers are created with resource limits to avoid exceeding pod resource limits;
scaling the first pod using the HPA based on the workload queue and resource metrics, wherein scaling the first pod creates additional pods having one or more ephemeral containers in a Kubernetes cluster when the workload queue exceeds a predefined threshold; and
executing the one or more tasks in the plurality ephemeral containers.

9. The system of claim 8, wherein the operations further comprise:
terminating at least one ephemeral container in the one or more ephemeral containers in the first pod based on the one or more resource allocations metrics.

10. The system of claim 8, wherein the operations further comprise:
determining a maximum ephemeral containers for the first pod based on the one or more resource allocation metrics;
generating a second pod comprising a second one or more ephemeral containers based on the workload requiring a number of ephemeral containers exceeding the maximum ephemeral containers for the first pod.

11. The system of claim 8, wherein the queue comprises a message queuing telemetry transport queue.

12. The system of claim 8, wherein the first pod comprises a Kubernetes pod.

13. A computer program product comprising a computer readable storage medium having program instructions embodied therewith, the program instructions executable by one or more processors to cause the one or more processors to perform operations comprising:
receiving, by a controller, a plurality of workloads each comprising one or more tasks, wherein the one or more tasks of the plurality of workloads are stored in a workload queue;
generating a first pod comprising a main container that is configured as a first sidecar container, wherein the first sidecar container executes a loop that is configured to keep the first pod from exiting;

generating within the first pod, by a pod manager, one or more initial ephemeral containers for the first pod;

executing the one or more tasks in the one or more ephemeral containers, wherein executing the one or more tasks comprises:

executing the one or more tasks in the one or more initial ephemeral containers;

monitoring one or more resource allocation metrics for the pod based on the execution of the initial ephemeral containers; and based on the workload queue and the monitoring, scaling the first pod using a pod manager and a horizontal pod autoscaler (HPA) to execute the one or more tasks in the workload queue, wherein the scaling the first pod includes the steps:

dynamically generating within the first pod, by a pod manager, one or more additional ephemeral containers for the first pod based on the workloads and one or more resource allocation metrics for the pod, wherein all ephemeral containers are created with resource limits to avoid exceeding pod resource limits;

scaling the first pod using the HPA based on the workload queue and resource metrics, wherein scaling the first pod creates additional pods having one or more ephemeral containers in a Kubernetes cluster when the workload queue exceeds a predefined threshold; and executing the one or more tasks in the plurality ephemeral containers.

14. The computer program product of claim 13, further comprising:

terminating at least one ephemeral container in the one or more ephemeral containers in the first pod based on the one or more resource allocations metrics.

15. The computer program product of claim 13, further comprising:

determining a maximum ephemeral containers for the first pod based on the one or more resource allocation metrics;

generating a second pod comprising a second one or more ephemeral containers based on the workload requiring a number of ephemeral containers exceeding the maximum ephemeral containers for the first pod.

16. The computer program product of claim 13, wherein the queue comprises a message queuing telemetry transport queue.

17. The computer program product of claim 13, wherein the first pod comprises a Kubernetes pod.

* * * * *